US011585111B2

(12) United States Patent
Mattana et al.

(10) Patent No.: US 11,585,111 B2
(45) Date of Patent: Feb. 21, 2023

(54) SOLAR CARPORT (71) Applicant: INHABIT SOLAR, LLC, New York, NY (US)

(72) Inventors: Michael Mattana, Syosset, NY (US); Oisin Clancy, New York, NY (US)

(73) Assignee: INHABIT SOLAR, LLC, New York, NY (US)

( * ) Notice: Subject to any disclaimer, the term of this patent is extended or adjusted under 35 U.S.C. 154(b) by 48 days.

(21) Appl. No.: 17/032,997

(22) Filed: Sep. 25, 2020

(65) Prior Publication Data
US 2021/0095490 A1 Apr. 1, 2021

Related U.S. Application Data (60) Provisional application No. 62/907,137, filed on Sep. 27, 2019.

(51) Int. Cl.
E04H 6/04 (2006.01)
H02S 20/30 (2014.01)
E04H 6/02 (2006.01)
E04B 1/34 (2006.01)

(52) U.S. Cl.
CPC ............ E04H 6/04 (2013.01); E04B 1/3416 (2013.01); E04H 6/025 (2013.01); H02S 20/30 (2014.12)

(58) Field of Classification Search
CPC ......... Y02E 10/50; Y02E 10/47; H02S 20/10; H02S 20/30; F24S 25/12; E04H 6/025; E04H 15/58; E04H 6/04; Y02B 10/10; E04B 1/3416
See application file for complete search history.

(56) References Cited

U.S. PATENT DOCUMENTS

| | | | | |
|---|---|---|---|---|
| 4,841,708 A * | 6/1989 | Johnston | ............... | E04G 1/12 249/18 |
| 6,058,930 A * | 5/2000 | Shingleton | ............ | F24S 30/425 126/600 |
| 7,836,879 B2 * | 11/2010 | Mackamul | ............ | F24S 30/425 126/600 |
| 8,136,783 B2 * | 3/2012 | Pietrzak | ................. | H02S 20/30 248/370 |
| 8,186,120 B2 * | 5/2012 | Beck | ...................... | H02S 20/10 52/644 |
| 8,993,870 B2 * | 3/2015 | Eom | ..................... | F24S 30/455 136/246 |
| 9,450,535 B2 * | 9/2016 | Domaleski | ............. | H02S 20/30 |
| 9,973,139 B2 * | 5/2018 | Goodman | ............... | F24S 25/70 |
| 10,014,819 B2 * | 7/2018 | Van Otten | ............... | F24S 25/61 |
| 10,876,319 B2 * | 12/2020 | Moeggenberg | ......... | E04H 15/54 |
| 10,917,036 B2 * | 2/2021 | Schilling | ............... | F24S 30/425 |

(Continued)

FOREIGN PATENT DOCUMENTS

DE   202016105226   * 11/2016
FR   2779758        * 6/1998

Primary Examiner — Brent W Herring
Assistant Examiner — Daniel J Kenny
(74) Attorney, Agent, or Firm — Tutunjian & Bitetto, P.C.

(57) ABSTRACT

Canopy structures and methods for erecting the same include a main support that is attached to a foot at a first pinned hinge point. A hub is attached to the main support at a second pinned hinge point. One or more arms are attached to the hub. One or more purlins are attached to the one or more arms. An upper surface mounted on the one or more purlins.

17 Claims, 11 Drawing Sheets (56) References Cited

U.S. PATENT DOCUMENTS

| | | | | |
|---|---|---|---|---|
| 11,088,654 B2* | 8/2021 | Zuritis | .................... | H02S 30/00 |
| 2018/0332154 A1* | 11/2018 | Gharabegian | .......... | G05B 15/02 |
| 2019/0386601 A1* | 12/2019 | Keller | ................... | F24S 25/617 |

* cited by examiner

SOLAR CARPORT

RELATED APPLICATION INFORMATION

This application claims priority to U.S. Patent Application Ser. No. 62/907,137, filed on Sep. 27, 2019, incorporated herein by reference in its entirety.

BACKGROUND

The present invention generally relates to solar-integrated structures and, and more particularly, to easy-to-assemble structures that provide shade and local solar power generation.

As city population density increases and cities themselves expand to occupy additional land area, the impact of cities on the environment increases. In particular, the effect of city space on land albedo, green spaces, and heat entrapment can be significant. As a result, a sustainable architecture movement has arisen that seeks to minimize the negative environmental impact of buildings.

One prominent feature of sustainable architecture is to maximize the utility of parking lots. Parking lots occupy large amounts of real estate and often have a dark albedo, absorbing light energy and converting large amounts of it to heat. However, large-scale construction of structures on existing parking lots is challenging.

SUMMARY

A canopy structure include a main support that is attached to a foot at a first pinned hinge point. A hub is attached to the main support at a second pinned hinge point. One or more arms are attached to the hub. One or more purlins are attached to the one or more arms. An upper surface mounted on the one or more purlins.

A canopy kit includes a foot, having a first hinge point. A main support has a second hinge point, configured to mate with the first hinge point, and has a third hinge point. A hub has a fourth hinge point, configured to mate with the third hinge point. A first pin is configured to mate the first hinge point to the second hinge point. A second pin is configured to mate the third hinge point to the fourth hinge point. One or more arms are configured to attach to the hub. One or more purlins are configured to attach to the one or more arms.

A method for assembling a canopy structure includes attaching a main support to a foot at a first hinge point. One or more arms are to the main support. An angular position of the one or more arms is set, relative to the main support. An angular position of the foot is set, relative to the main support.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Described herein are embodiments of a structure that can be readily assembled, without sophisticated tools, to provide shade and renewable energy generation. The structure may be used as part of an energy infrastructure, that can include enclosure systems to support an energy goal. The structure generally includes a support, a hub, and one or more arms that can, in turn, support a variety of devices and surfaces, such as solar panels. The structure provides internal spaces, or enclosure systems, that can be adapted for a wide variety of purpose, such as energy storage, energy distribution, energy delivery, as well as provides shade and auxiliary spaces, utilitarian functions, habitable enclosures, and a variety of urban furniture and landscape features. Additionally, multiple such structures can be combined, both laterally and vertically, to form elaborate superstructures.

Under 2% of energy use comes from solar. Solar technology costs are dropping rapidly and the international adoption is rapid. However, there are still many barriers to solar adoption in dense urban areas, including cost and complexity of erecting solar surfaces over the varied urban landscape. To help address these challenges, support structures can be formed that may be light in weight, rapidly prefabricated, flat-backed, and shipped directly to the construction site. The design can provide fast and inexpensive construction due to lightweight parts and a pivoting 'tilt up' method of assembly, assisted by erection jacks and other methods. Extensive solar canopies can thus be rapidly and inexpensively deployed.

Battery and charging technologies can further be integrated. With battery integration, operating costs are reduced, and backup energy may be provided in the event of a loss of external power. Integrated device and vehicle charging can be implemented. These structures can provide such benefits as generating clean solar power, storing electric energy for low cost power, and charging electric vehicles (EVs), electric bikes, scooters, etc.

The ability to rapidly deploy permanent and semi-permanent outdoor spaces is particularly useful in circumstances where indoor spaces are not preferred, such as in a health emergency or during renovations of an indoor space. The present embodiments provide structures that can be rapidly and inexpensively fabricated, shipped, and installed, for example using hand tools. Thus, a large amount of exposed urban area can quickly be covered, providing shelter and utility for a variety of purposes.

Figure 1:
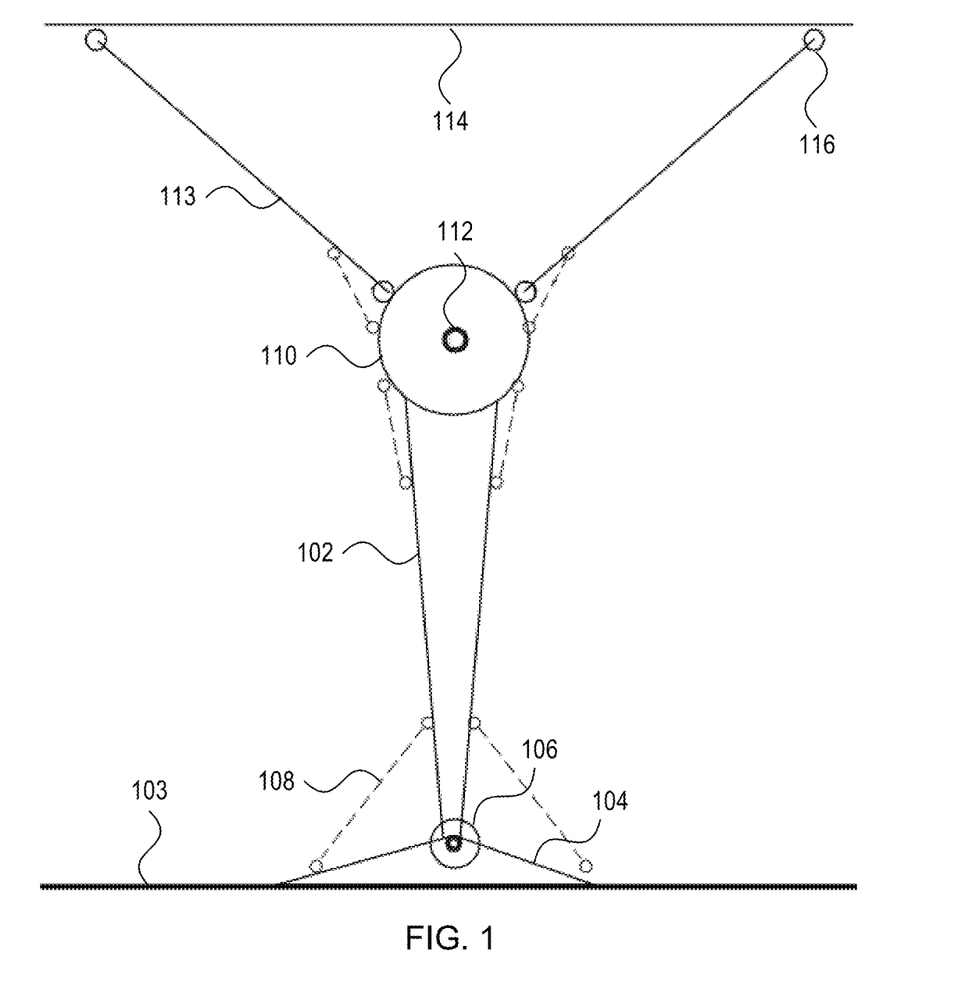
FIG. 1 shows a schematic diagram of a canopy structure, in accordance with an embodiment of the present invention.

Referring now to FIG. 1, a side view of a solar canopy structure is shown. This view shows a high-level arrangement of a canopy structure, with more practical views being described below. It should be understood that this view is intended to introduce the features in a way that is not necessarily to scale, and thus should not be construed as limiting to the particular shapes and proportions of the various elements. A main support 102 may be attached to an underlying surface 103 by a foot 104.

The foot 104 may be attached to the underlying surface 103 by any appropriate connection. In some cases, some or all of the foot 104 may be embedded in the underlying surface, for example by burying the foot 104 in a trench in the underlying surface 103. The foot 104 may also or alternatively be secured to rods that are embedded in underlying surface 103. In some cases, the foot 104 may be freestanding, with no permanent connection to the underlying surface 103. In some cases, the foot 104 can use base plates that accommodate a shallow grade beam foundation that is reinforced with helical piles. The foot 104 may also be attached to an underlying structure, for example in a rooftop installation. The foot 104 may have a long interface with the underlying surface 103, to better distribute the weight of the structure and to minimize the need for extensive foundation work.

While it is specifically contemplated that the underlying surface 103 may be a manmade surface, such as a concrete or blacktop structure on a roof or in a parking lot, it should be understood that the underlying surface 103 may also be the bare ground. As will be described in greater detail below, the support 102 may alternatively be connected to a portion of a lower canopy structure.

The support 102 may be connected to the foot 104 by a hinge structure 106, such as a pin. In some cases, the support 102 may freely pivot around the hinge structure 106. During assembly, the support 102 may be moved into position by push/pull members 108, such as erection jacks or other support members. Although a symmetric arrangement of push/pull members 108 is shown, it should be understood that only one such element may be used in some cases.

After the support 102 has been moved into its final position, the support 102 may be bolted to the foot 104. In some cases, the push/pull members 108 may be left in place. In some cases, the push/pull members 108 may be removed entirely, or may be replaced with buttressing elements. The support 102 may be moved into a different position after its initial installation, or may be fixed permanently in place. In some cases, the support 102 may not be fixed in place, but may remain movable, for example using the push/pull members or any other appropriate mechanism. The angular position of the support 102 may be varied according to, e.g., sun position or any other appropriate consideration.

A hub 110 may connect to the main support 102 by a hinge structure 112, and may be positioned with the use of further push/pull members 108. Although shown in this view as a circular structure, the hub 110 may take any appropriate shape, with some particular examples being shown below. Once in its intended position, the hub 110 may be secured to the main support 102 by bolting it in place, by replacing the push/pull members 108 with buttressing elements, by a combination of these, or by any other appropriate means.

One or more arms 113 are connected to the hub 110. The arms 113 may be positioned with the use of further push/pull members 108, and may be fixed in place with bolts and/or buttressing elements. In some cases, one or more of the arms 113 may be formed with the hub 110 as a single piece, while others may be separate pieces.

Purlins 116 may be mounted to the arms 113. These purlins 116 represent crossbar structures that may be oriented, for example, in a manner that is not parallel to a shared plane of the main support 102 and the arms 110. In some cases, the purlins 116 may be oriented perpendicular to the arms 113, for example in a direction perpendicular to the plane of FIG. 1. The purlins 116 may support an upper surface 114. This upper surface 114 may, in some cases, be a simple shade structure or roof. In some cases, the upper surface 114 may include device components such as solar panels.

It is contemplated that each of foot 104, the main support 102, the hub 110, and the arms 113 may include internal cavities that are suitable for storing functional components. The positive and negative spaces created by these components, both individually and in conjunction with one another, can be used to create 3d volumes within a single canopy array, or multiple arrays in series, to create space for the storage of functional components as well as other architectural benefits. Additional pieces may be formed to fit into these spaces and provide housing for such functional components.

For example, it is contemplated that the canopy structure may be integrated with an internal battery system (not shown) and charging infrastructure, which may take electrical power generated by solar panels on the upper surface 114 and may make it available on the grid or for on-site charging of devices. The space between the arms 113 and the upper surface 114 is similarly available for integration with functional components. Examples of functional equipment that may thus be integrated with the canopy include, but are not limited to, air conditioning units, energy storage systems, fuel cell systems, and fire suppression systems. In one particular example, the structure may be mounted around large air conditioner units, which helps to shield such units from the elements, without interfering with their operation. Thus, air flow to the air conditioner units can be maintained, and access permitted, with a structure that is supported on either side of the air conditioner units.

In some examples, the pieces can be attached to one another at the installation location or offsite, and can then moved into place using the push/pull members 108. For example, in some cases, the pieces may be delivered to the installation site in an unassembled state, and then be assembled on-site. In this manner, the canopy can be delivered to a site as flat pieces and can be assembled using hand tools, avoiding significant costs that would otherwise be associated with transportation and construction. In other cases, some or all of the pieces can be assembled in advance, and can then be delivered in a collapsed state, to be erected at the installation site. Disassembly is similarly simple, and can be performed using push/pull members 108. The canopy can thus be disassembled and moved, making the structure reusable. In some embodiments, erection can be performed with a remote controlled 'robotic' self-erecting version.

The canopy structure may be designed with height clearance to provide space for cars, commercial vehicles, urban space, or HVAC or other large electric or mechanical infrastructure. By integrating energy technology functions with the structure of the canopy, three important functions can be performed in a single structure, including energy collection, energy storage, and energy distribution. In one particular example, the upper surface 114 may collect solar energy, with electrical conductors in the arms 113 connecting the upper surface 114 to energy collection devices. These energy collection devices may be located at any appropriate point in the structure, such as the hub 110, the main support 102, or the foot 104. Additional devices may be provided at convenient locations within the structure to provide energy distribution, such as charging points, battery swaps, etc. It should be noted that the integration of additional features can be done in a modular fashion, with different mounting plates and fixtures that attach to the leg assemblies to accommodate relevant equipment and that can be swapped out as newer technologies and products become available.

Figure 2:
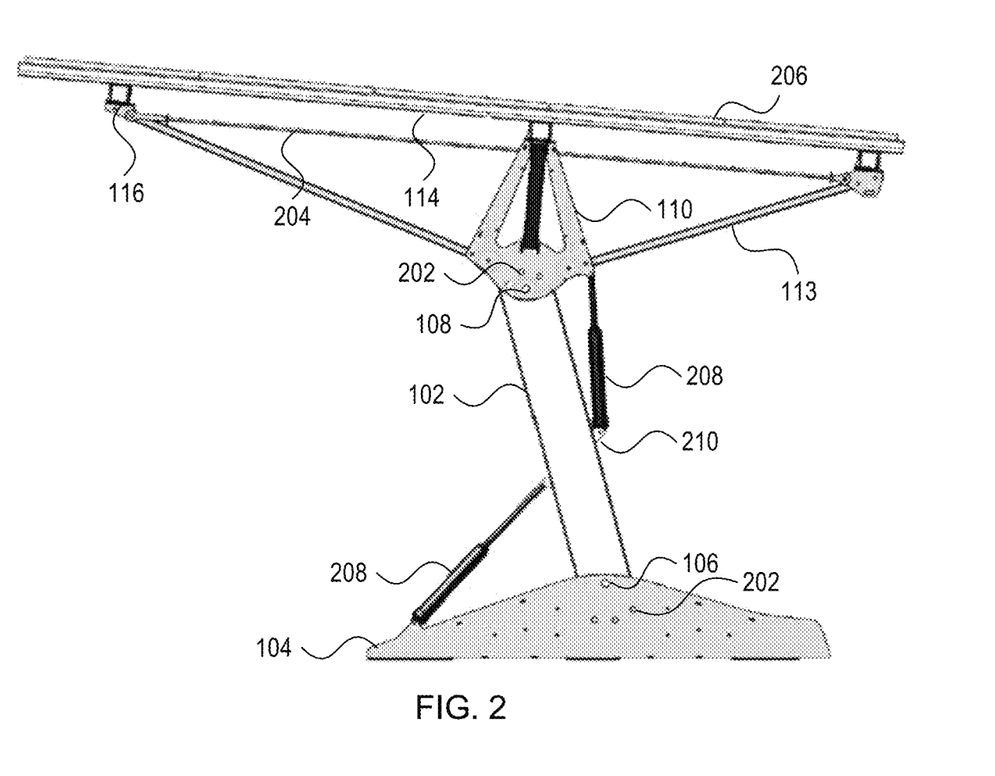
FIG. 2 shows a side view of a canopy structure, with erection jacks that can be used to erect the canopy structure, in accordance with an embodiment of the present invention.

Referring now to FIG. 2, a particular example of a canopy structure is shown. In addition to features that are discussed above, with respect to FIG. 1, this view shows bolts 202, which may fix the main support 102 to the foot 104, and the hub 110 to the main support 102. Also shown is a cross-piece 204, which connects to the distal ends of the two arms 113, and which may be used to provide additional stability and strength. The solar panels 206 are shown as being positioned on top of the upper surface 114. The hub 110 is shown as having a shape that is particularly suited to mating with the arms 113, the main support 102, and which can furthermore provide central support to the upper surface 114. This view is shown with erection jacks 208 in place as the push/pull members 108. The jacks 208 connect to attachment points 210 on the support 102, foot 104, and hub 110.

Figure 3:
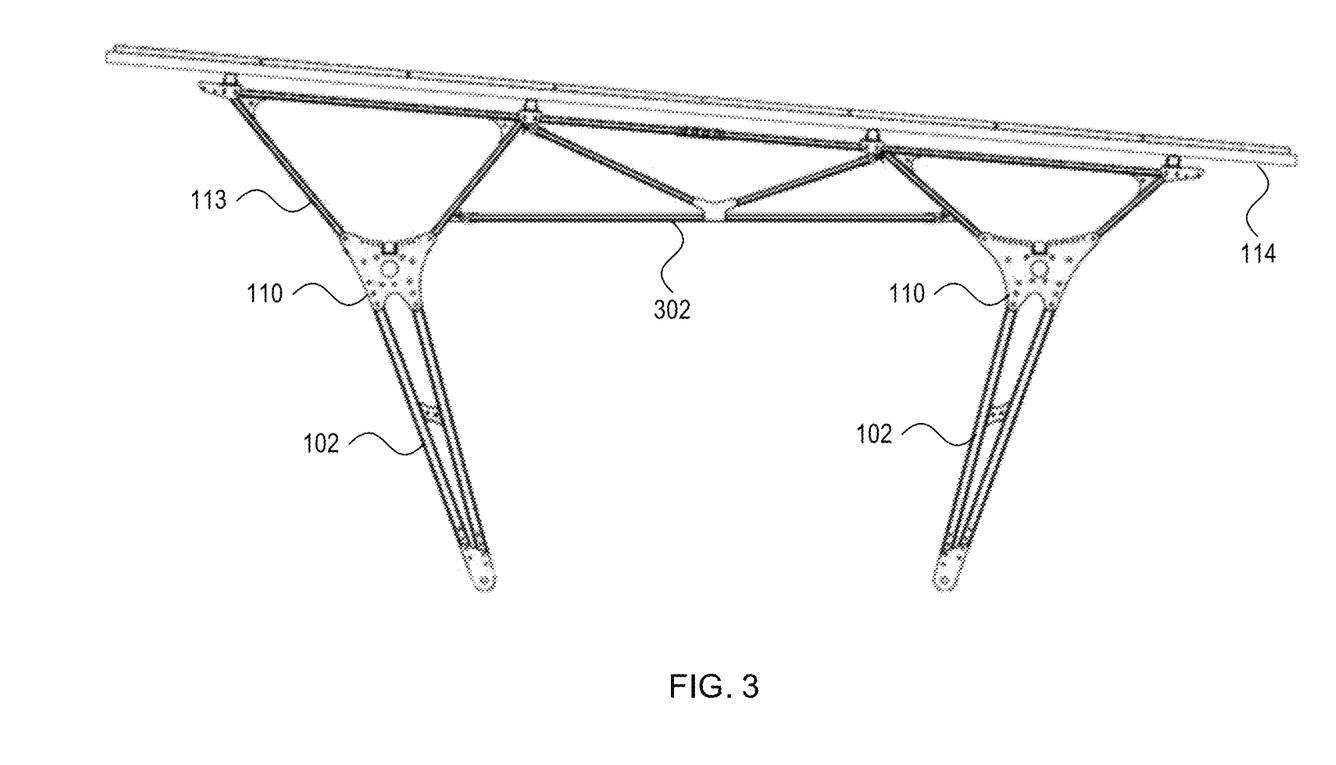
FIG. 3 shows a side view of a combined canopy structure, with multiple supports arranged in line, in accordance with an embodiment of the present invention.

Referring now to FIG. 3, a particular example of a combined canopy structure is shown. This structure combines two individual canopy sections, as described above, with respective main supports 102, respective hubs 110, and respective arms 113, supporting a shared upper surface 114. In some cases, an additional brace 302 may be introduced to provide structural stability between the two canopy structures, but in other cases the brace 302 may be omitted, for example if the upper surface 114 is not too heavy and can provide this structural support. The brace 302 may be a tension rod, a coupler, a wire, truss, frame, or any other appropriate structure.

The combined canopy structure can be assembled by raising each individual support 102 separately and then connecting them using the brace 302. In some configurations, where the main supports 102 are raised in parallel, the two supports 102 may be connected on the ground and raised in tandem.

Although this example shows a combined canopy that is formed from two supports, it should be understood that any number of supports 102 may be assembled in a line. Additionally, parallel sets of supports 102 may be assembled to create a canopy structure that extends perpendicularly to the illustrated plane, with the purlins 116 providing a unified frame for the upper shared surface 114.

Figure 4:
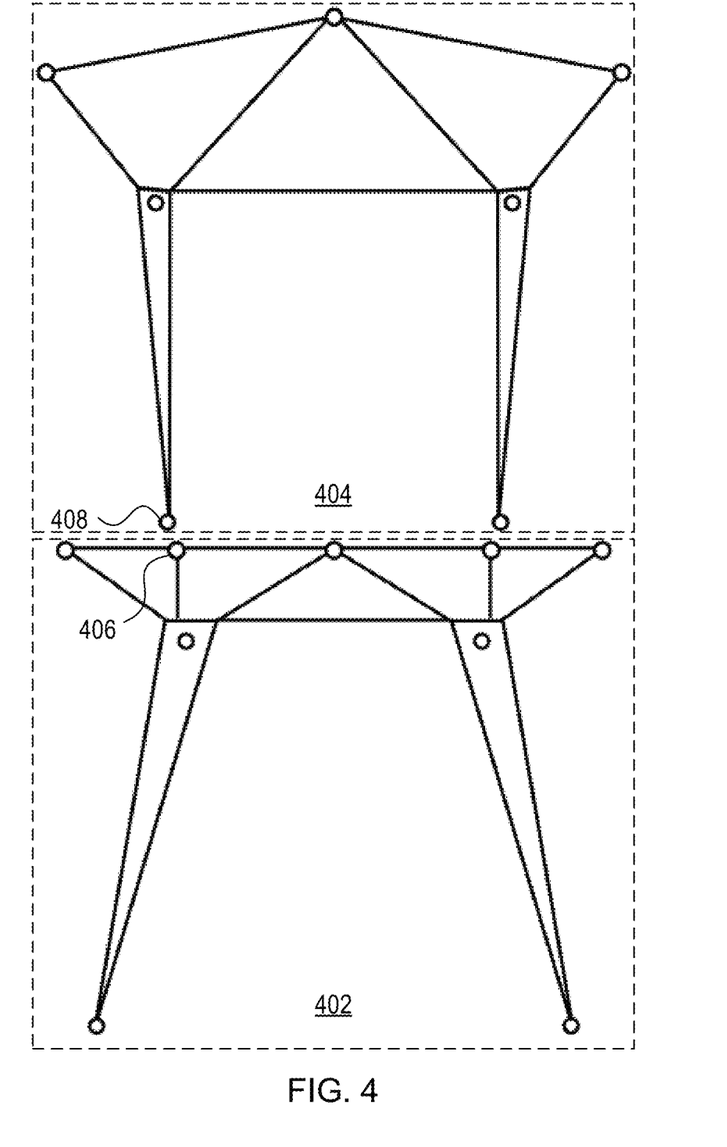
FIG. 4 shows a schematic diagram of a combined canopy structure, with multiple supports arranged in line and vertically, in accordance with an embodiment of the present invention.

Referring now to FIG. 4, a particular example of a multi-level combined canopy structure is shown in schematic form. A lower level 402 and an upper level 404 are shown, with the hinge points 408 of the upper level 404 connecting to attachment points 406 on the lower level 402. In such configurations, the upper level 404 may be assembled and raised first, using the connection points 406 in place of the feet 104. Alternatively, a foot 104 may be attached to the connection point 406 and may be used to attach the upper level support. The connection point 406 may include a mounting fixture on an arm of the lower level 402. The downward force of the weight of the upper level 402 can thereby sent through the arm to the structure of the lower level 402, providing structural support and stability.

Once the upper level 404 is positioned and fixed in place, the lower level 402 may be raised, lifting the entire upper level 404 above it as it moves into position, with the lower level 402 being fixed to feet 104. The assembly of multi-level combined canopy structures can be extended to include any appropriate upper-level structure, within the structural limits of the materials and the lifting capacity of the push/pull members 108.

Figure 5:
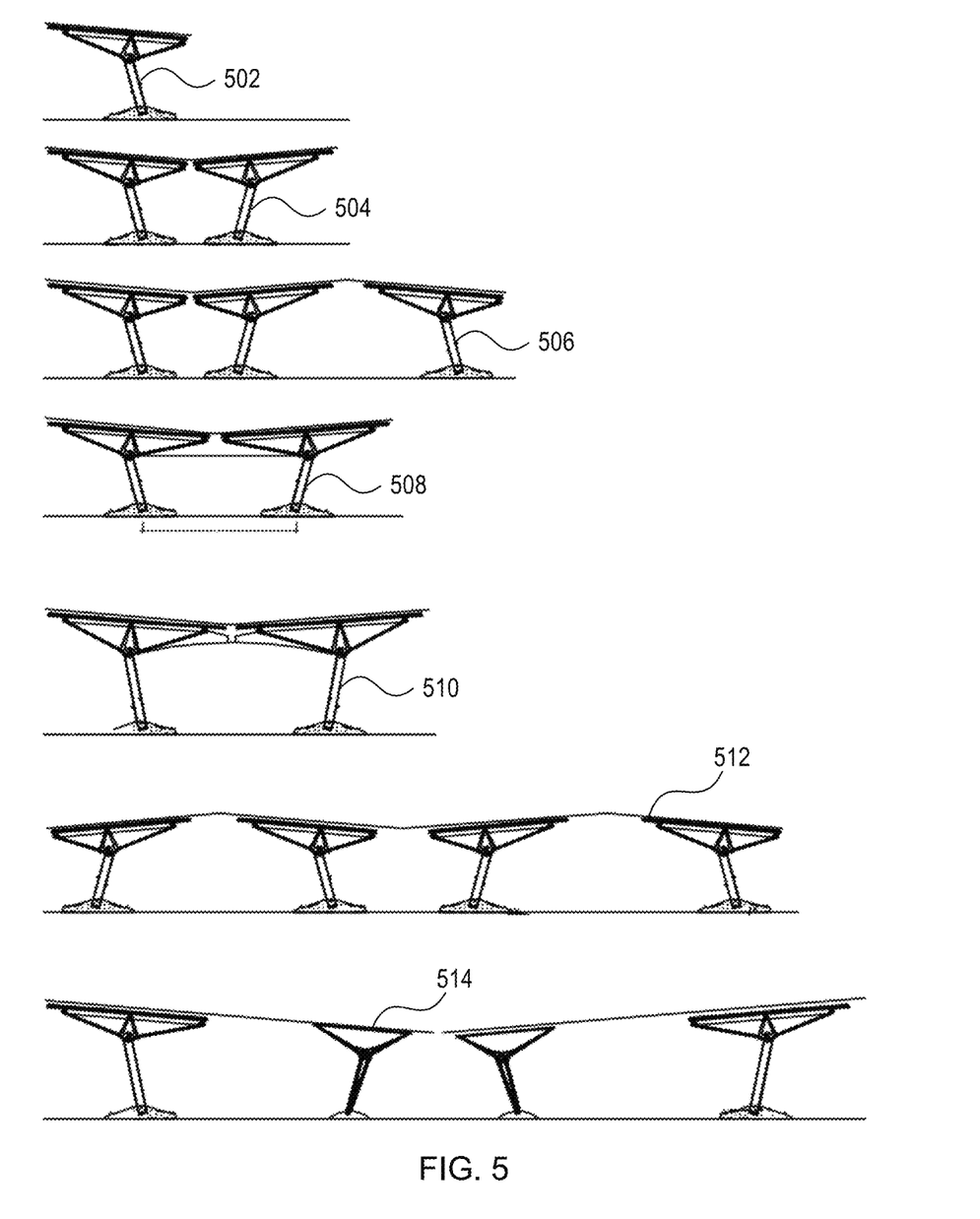
FIG. 5 shows a side view of multiple arrangements of canopy structures and combined canopy structures, in accordance with various embodiments of the present invention.
Figure 11:
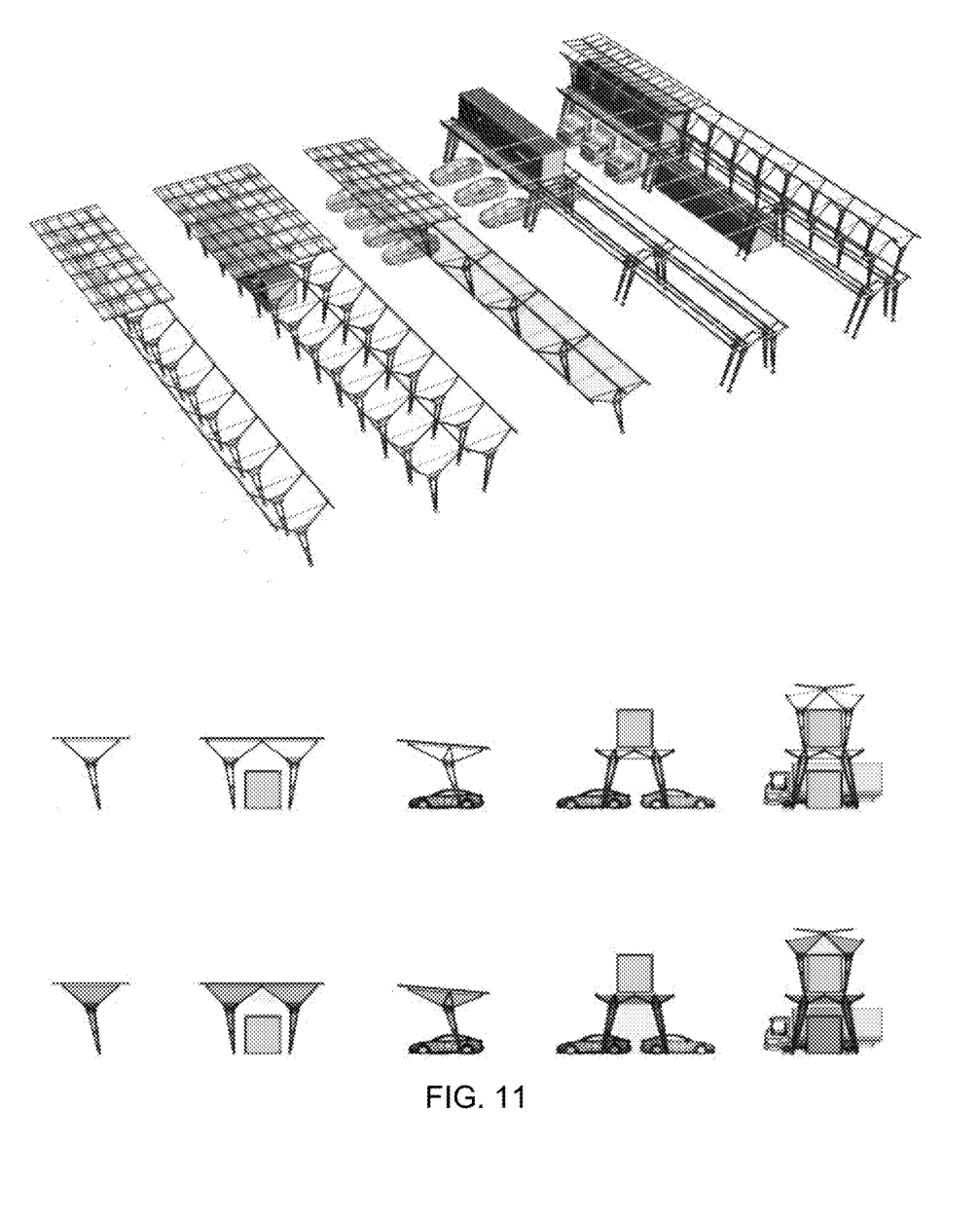
FIG. 11 shows a variety of arrangements of canopy structures and combined canopy structures, in accordance with various embodiments of the present invention.

Referring now to FIG. 5, a set of different arrangements of canopy structures are shown. Structure 502 shows a structure with a single support and a sloping top surface. Structure 504 shows two supports, with respectively sloping top surfaces that meet at a middle line. Structures 506 and 512 show how this general structure can be extended indefinitely, with additional supports holding up upper surfaces that meet the upper surfaces of neighboring supports. While the sloped surface positions solar panels at optimum angles for energy harvesting, it should be understood that a horizontal upper surface may be used across the supports instead. Structure 514 illustrates how multiple supports may share a consistently sloped upper surface, with one support being larger than the other. These differently sized supports may also be used to help conform to uneven terrain, with shorter supports being used on points of higher relative elevation. Furthermore, larger structures can be used in contexts where monolithic designs and/or fewer connections to the ground are preferred. Structures 508 and 510 illustrate different kinds of inter-support braces, with structure 508 showing a simple cross-piece, and with structure 510 showing a curved frame. Trusses may be used to provide structural support for longer spans. FIG. 11 shows additional arrangements.

Figure 6:
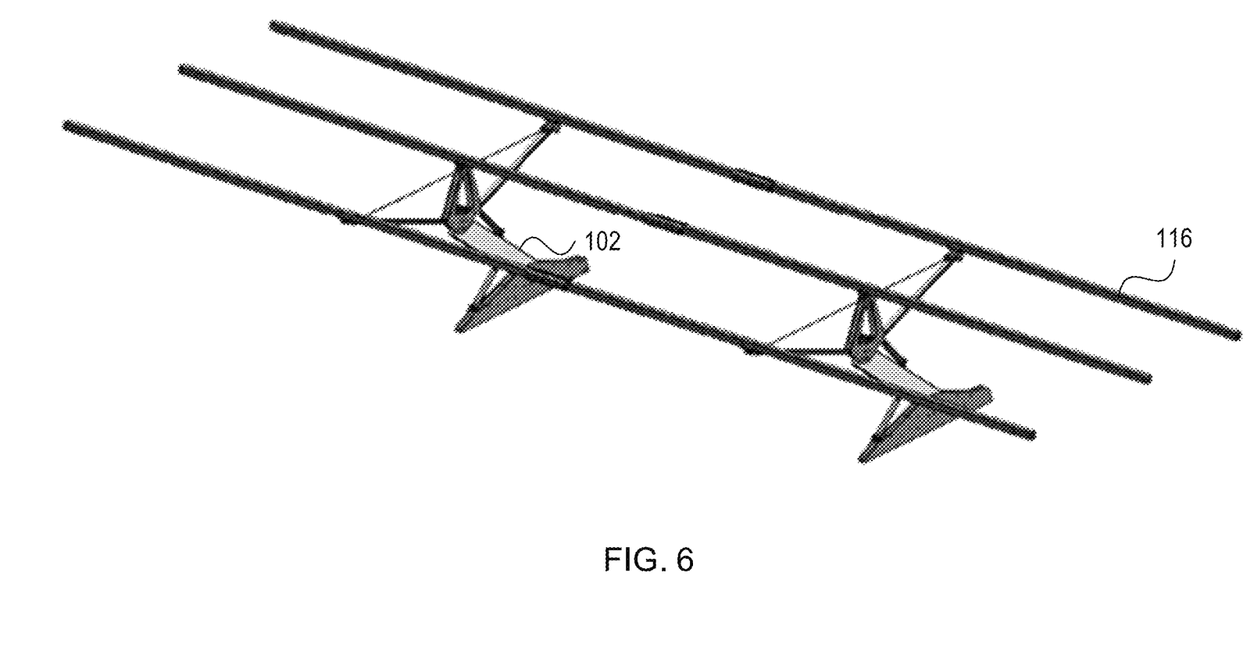
FIG. 6 shows a perspective view of a combined canopy structure, with multiple supports arranged laterally, in accordance with an embodiment of the present invention.

Referring now to FIG. 6, a perspective view is shown of a side-by-side arrangement of canopy structures, with shared purlins 116. The respective supports 102 hold up different sections of the purlins 116. By arranging supports 102 in two dimensions, both along the plane of a given support 102 and outside the plane of that support, an upper surface can be formed that has a substantial area.

Figure 7:
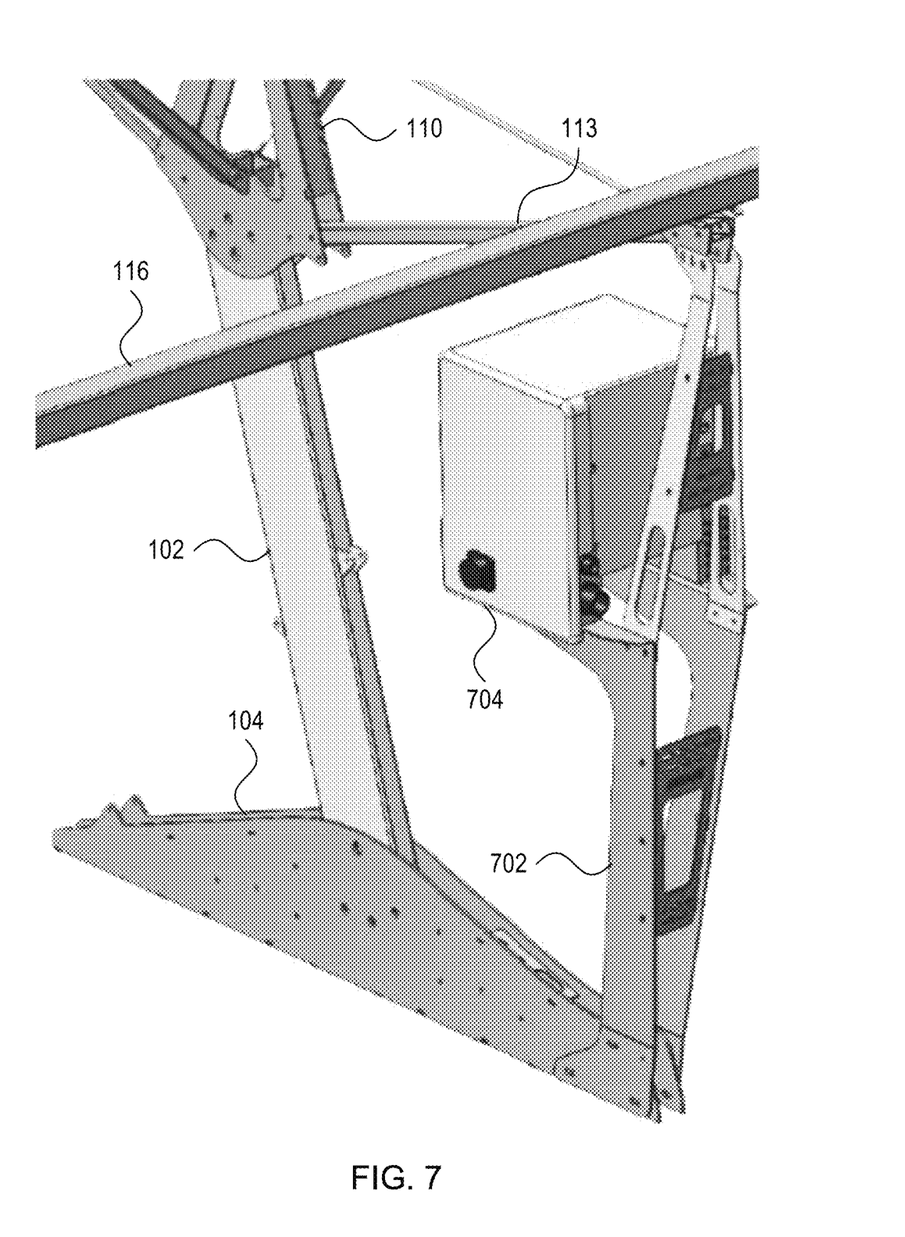
FIG. 7 shows a perspective view of a canopy structure with a utility box and support, in accordance with an embodiment of the present invention.

Referring now to FIG. 7, a perspective view is shown of a canopy structure with an additional utility structure. The utility structure includes a leg 702, that may connect to the foot 104, and a utility box 704. The utility box 704 may be attached to the leg 702 and may include any appropriate systems. The leg 702 may connect to an arm 113 and may provide additional support for a purlin 116.

As can be seen in this view, the foot 104 may be formed from two parallel plates, having respective sets of aligned holes. The main support 102 may slot between the two parallel plates. Holes in the main support 102 may align with holes in the two parallel plates, to accommodate a pin at the hinge point, and to accommodate bolts that fix the position of the main support 102 relative to the foot 104. The two parallel plates of the foot 104 may be separated by one or more internal spacers.

The canopy structure includes a number of internal spaces, which can be used to implement a variety of different functions. These functions may include, but are not limited to, energy production, including hardware and software systems that convert energy from one form to another, such as solar power generation, thermal power generation, and piezoelectric power generation; energy storage, including hardware and software systems that can store energy for a period of time and release it for later use; energy distribution, including hardware and software systems that can distribute or pass energy from one location to another, for example collecting the power generated by multiple solar canopies; monitoring and control, including hardware and software systems that monitor and control the production, storage and distribution of energy; communication systems, including hardware and software that systems receive input from the environment and transmit information to other locations or devices, such as radio communications systems, wired communication systems, and fiber optics; environmental control and comfort systems, including equipment and related software and hardware that service and control devices maintaining environmental conditions, including cooling devices, heating devices, climatic control equipment, air and liquid movement fans, and lighting; sensor systems, including devices for measuring, recording and sharing data relating to temperature, humidity, pollution, particulate matter, insolation, carbon dioxide, wind speed, and rain levels.

In addition, the canopy structures can provide the functions of shade, storage (such as cold storage and warm storage), fitness (such as including bars, stationary bikes), shelving, vending, advertising, water management (such as collection, storage, and irrigation), electric vehicle charging, wireless charging, information kiosks, and security/surveillance. The structure itself may be adapted to provide points for human interaction, including benches, tables, kiosks, and bars.

It is particularly contemplated that the canopy structure may include charging systems for electric vehicles, personal electronic devices, wireless charging systems, electrical outlets, and any other appropriate electricity distribution endpoint. These devices may be powered by the grid, by local power generation (e.g., solar power), or by a combination of the two. The canopy structure may also provide power storage that can, for example, provide battery power backup in the event of a blackout.

It is also contemplated that the canopy structure may provide a space for green surfaces. In the particular example of an installation over a parking lot, where the natural green space has been replaced by a dark surface, the upper surfaces 114 of the canopy structure can be used to provide planters, greenhouses, and any variety of plant installation. Such installations may include rain collection and irrigation, green walls, green screens, trellises, hydroponics, aquaponics, and mist and drip irrigation systems.

Figure 8:
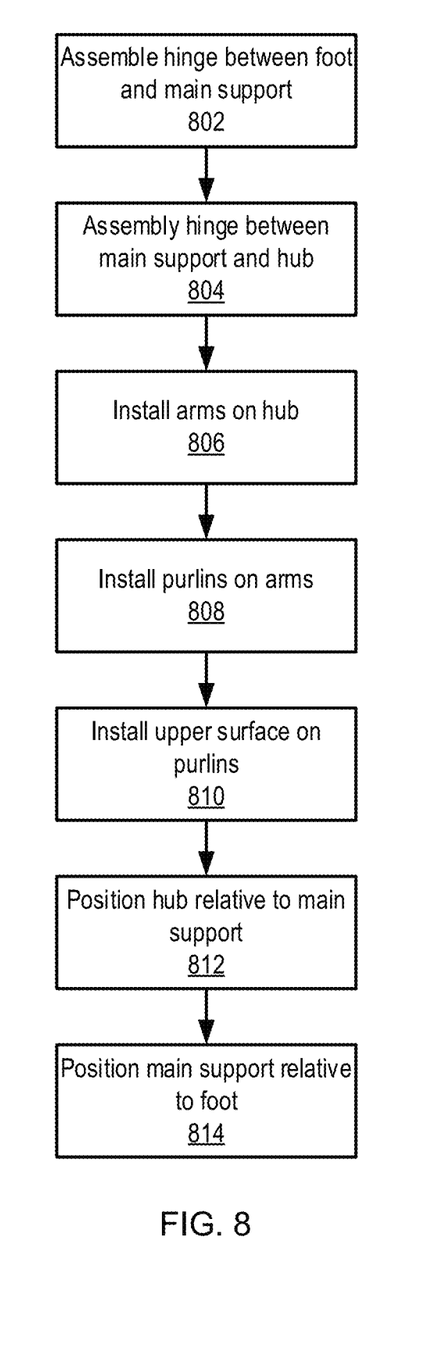
FIG. 8 shows a block/flow diagram of a method for erecting a canopy structure, in accordance with an embodiment of the present invention.

Referring now to FIG. 8, a method of assembling a canopy structure is shown. It should be understood that these steps need not necessarily be performed in order. Block 802 assembles the hinge point 106 between the foot 104 and the main support 102. This may be accomplished by aligning a hole in the main support 102 with a corresponding hole in the foot 104 and inserting a pin. Block 804 assembles the hinge 112 between the main support 102 and the hub 110. This may similarly be accomplished by aligning a hole in the main support 102 with a corresponding hole in the hub 110 and inserting a pin. At this stage, the hinges 106 and 112 can still rotate freely.

Block 806 installs the arms 113 on the hub 110, for example by bolting them in place, or by any other appropriate affixation. Block 808 installs the purlins 116 on the arms, and block 810 installs the upper surface 114 on the purlins 116. Thus, the entire top portion of the canopy structure may be fixedly assembled before the structure is raised.

Block 812 positions the hub 110 relative to the main support 102. This can be performed by any appropriate tools, with a jack being specifically contemplated. The jack may be attached to attachment points 210 on the hub 110 and on the main support 102, and may then be used to change the angular position of the hub 110 relative to the main support 102, pivoting around the hinge point 108. Once a desired angular position between the hub 110 and the main support 102 has been reached, the hub 110 can be fixed to the main support 102, for example using bolts.

Block 814 then positions the main support 102 relative to the foot 104. This can be performed by any appropriate tools, with a jack being specifically contemplated. The jack may be attached to attachment points 210 on the foot 104 and on the main support 102, and may then be used to change the angular position of the main support 102 relative to the foot 104, pivoting around the hinge point 106. Once a desired angular position between the main support 102 and the foot 104 has been reached, the main support 102 can be fixed to the foot 104, for example using bolts.

Figure 9:
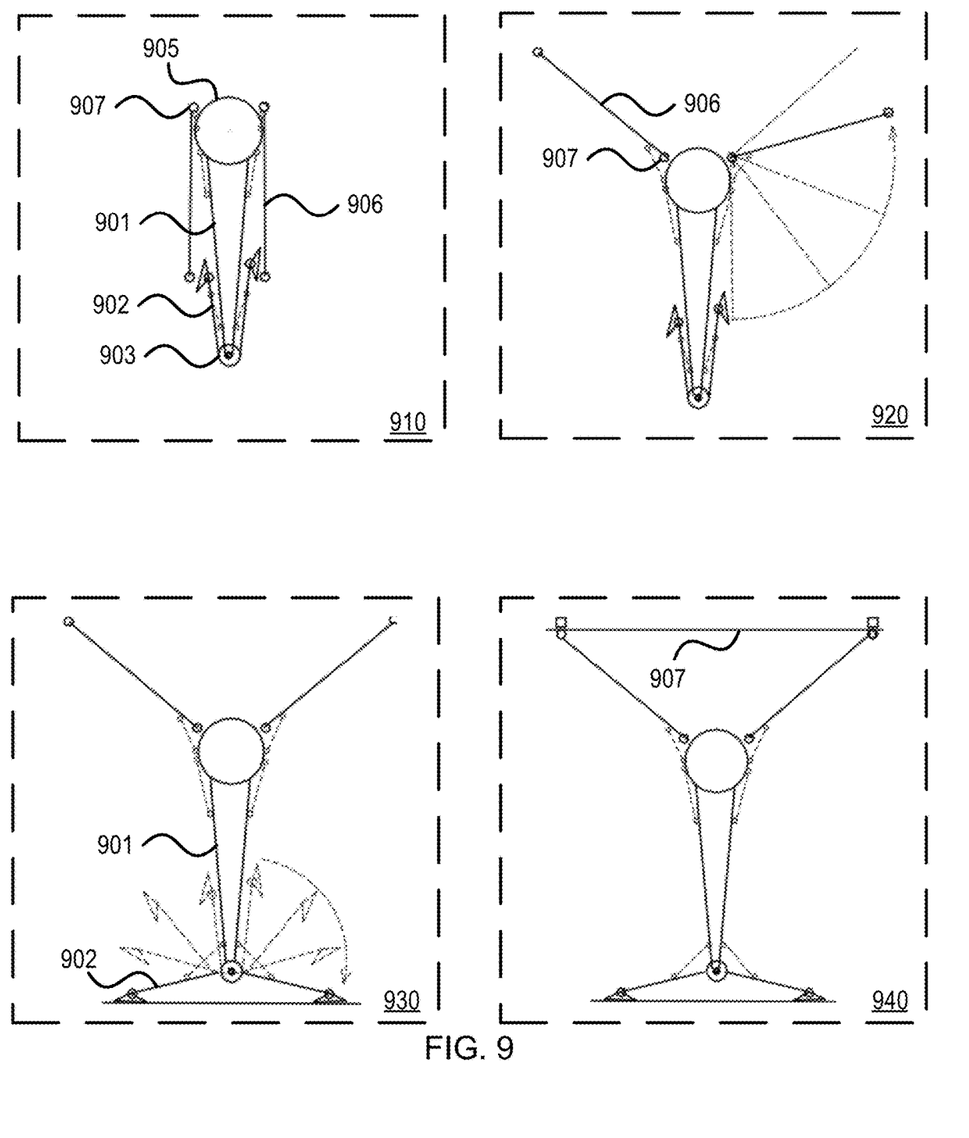
FIG. 9 shows a schematic set of steps of a method for erecting a canopy structure, in accordance with an embodiment of the present invention.

Referring now to FIG. 9, a canopy structure is shown in a pre-assembled form, and is installed in a series of steps. The arms 906 attach to the hub 905 at respective hinge structures 907 and may be delivered collapsed against the main support 901. Rather than a monolithic foot, two base supports 902 are connected to the main support 901 at a hinge structure 903, and may be delivered collapsed against the mains support 901. The structure may be assembled before delivery and shipped to the installation site. At the installation side, a crane or other tool may be used to raise the structure by the hub 905.

At this time, the arms 906 can be raised into position and then fixed into place relative to the hub 905, for example using bolts or an appropriate bracket. The base supports 902 can then be lowered and fixed in place relative to the main support 901, for example using bolts or an appropriate bracket. The entire structure can be lowered to its final installation location, and the base supports 902 can be attached to the ground in any appropriate fashion, for example by fixing them to an anchor plate that is attached to the ground by any appropriate structure, such as beams or helical piles.

The steps of this process are illustrated as step 910, where the structure is delivered in its collapsed form. In step 920, the arms 906 are rotated up and are locked into place. In step 930, the base supports 902 are rotated down and are fixed relative to the main support 901, which may include adjusting the levels of the base supports 902 to accommodate the grade. Step 930 may also fix the base supports 902 to an anchor plate. Step 940 may then add cross-bracing 908 to the arms 906, and may further add purlins and an upper surface.

Figure 10:
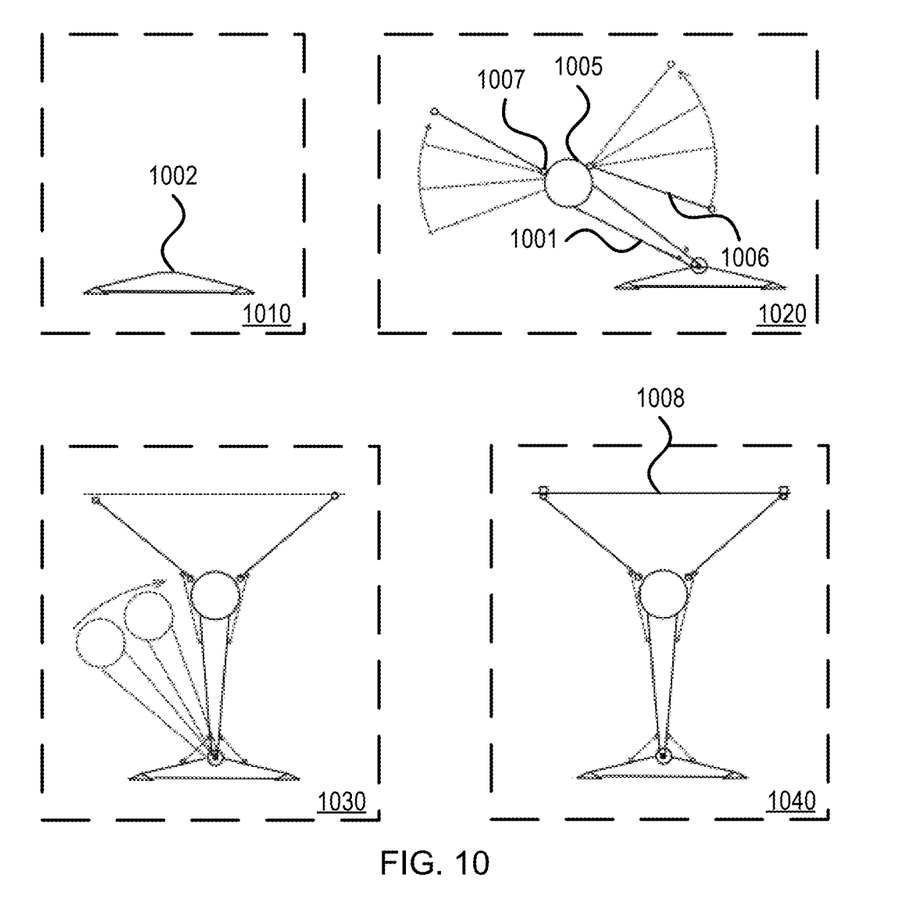
FIG. 10 shows a schematic set of steps of a method for erecting a canopy structure, in accordance with an embodiment of the present invention.

Referring now to FIG. 10, a canopy structure is shown being assembled on-site in a series of steps. In step 1010, a foot 1002 is fixed to the ground in any appropriate fashion, such as embedding it in an underlying surface or by attaching it to a base place, which in turn may be anchored in any appropriate fashion. The main support 1001 is attached to the foot 1002 at a first hinge structure 1003.

In step 1020, arms 1006 are attached to a hub 1005, which in turn is attached to the main support 1001. In some embodiments, the hub 1005 may be attached to the main support 1001 at a second hinge structure, while, in other embodiments, the hub 1005 may be attached in a fixed fashion. Arms 1006 are attached to the hub 1005 at respective arm hinge structures 1007, and may be raised to any appropriate angle before being fixed in place.

In step 1030, the main support 1001 may be erected relative to the ground, as described above. Erection jacks or other support members can be used to move the main support 1001 into place, before the main support 1001 is fixed to the foot 1002. In embodiments where the hub 1005 is attached to the main support 1001 at a second hinge structure, the angular position of the hub 1005 may also be set and fixed in this step. In step 1040, the cross brace 1008 is attached between the arms 1006. Purlins may be set across the arms 1006, and a top surface may be mounted.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," when used herein, specify the presence of stated features, integers, steps, operations, elements and/or components, but do not preclude the presence or addition of one or more other features, integers, steps operations, elements, components and/or groups thereof.

Spatially relative terms, such as "beneath," "below", "lower," "above," "upper," and the like, can be used herein for ease of description to describe one elements or feature's relationship to another element(s) or feature(s) as illustrated in the FIGS. It will be understood that the spatially relative terms are intended to encompass different orientations of the device operation in addition to the orientation depicted FIGS. For example, if the device in the FIGS. is turned over elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it ill also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A canopy structure, comprising:
    a main support that is attached to a foot at a first pinned hinge point, wherein the main support includes a first attachment point, positioned at a first distance from the first pinned hinge point, and a third attachment point, and wherein the foot includes a second attachment point;
    a hub that is attached to the main support at a second pinned hinge point and that includes a fourth attachment point, spaced apart from the third attachment point such that a jack can be attached to the third attachment point and the fourth attachment point for use in rotating the hub relative to the main support;
    one or more arms that are attached to the hub;
    one or more purlins, attached to the one or more arms; and
    an upper surface mounted on the one or more purlins.

2. The canopy structure of claim 1, wherein the main support is further bolted to the main foot and wherein the hub is further bolted to the main support.

3. The canopy structure of claim 1, wherein the one or more arms includes a plurality of arms, further comprising a brace that connects the plurality of arms to one another to provide structural support.

4. The canopy structure of claim 1, wherein the hub includes a support structure that supports the upper surface from below.

5. The canopy structure of claim 1, further comprising an energy generation system that includes one or more solar panels, mounted on the upper surface.

6. The canopy structure of claim 5, further comprising a control unit, mounted to the hub, configured to process electrical power generated by the one or more solar panels.

7. The canopy structure of claim 5, further comprising a utility support, attached to the foot, that includes a utility box configured to process electrical power generated by the one or more solar panels.

8. The canopy structure of claim 1, further comprising the foot, which includes two base supports that are connected to the main support at the first pinned hinge point.

9. A canopy kit, comprising:
a foot, having a first hinge point and a first attachment point;
a main support, having a second hinge point, configured to mate with the first hinge point, having a third hinge point, and having a second attachment point, positioned at a first distance from the second hinge point;
a hub, having a fourth hinge point, configured to mate with the third hinge point;
a first pin configured to mate the first hinge point to the second hinge point;
a second pin configured to mate the third hinge point to the fourth hinge point;
one or more arms that are configured to attach to the hub; and
one or more purlins, configured to attach to the one or more arms.

10. The canopy kit of claim 9, further comprising an erection jack, configured to attach between the main support and the foot, and between the main support and the hub, to control an angular position of respective hinges.

11. The canopy kit of claim 10, wherein the main support has a third attachment point, wherein the hub has a fourth attachment point, and wherein each attachment point is configured to attach to the erection jack.

12. The canopy kit of claim 9, wherein the one or more arms includes a plurality of arms, and further comprising a brace that is configured to connect the plurality of arms to one another, to provide structural support.

13. The canopy kit of claim 9, wherein the foot includes multiple base supports, each having a respective hinge structure that together form the first hinge point.

14. A method for assembling a canopy structure, comprising:
attaching a main support to a foot at a first hinge point;
attaching one or more arms to the main support;
setting an angular position of the one or more arms, relative to the main support; and
setting an angular position of the foot, relative to the main support, including:
attaching an erection jack to respective attachment points on the main support and the foot;
rotating the main support using the erection jack; and
bolting the main support to the foot.

15. The method of claim 14, wherein the foot includes multiple base supports, and wherein attaching the main support to the foot includes inserting a pin that connects the main support to the base supports at the first hinge point.

16. The method of claim 15, wherein setting the angular position of the foot, relative to the main support, comprises rotating each of the multiple base supports, around the first hinge point, to a ground position.

17. The method of claim 14, further comprising attaching a hub to the main support, by inserting a pin that connects the hub to the main support at a second hinge point, wherein attaching the one or more arms to the main support includes attaching the one or more arms to the hub, and wherein setting the angular position of the one or more arms, relative to the main support, comprises:
attaching an erection jack to respective attachment points on the main support and the hub;
rotating the hub using the erection jack; and
bolting the hub to the main support.

* * * * *